US007012761B1

(12) United States Patent
Schmidt et al.

(10) Patent No.: US 7,012,761 B1
(45) Date of Patent: Mar. 14, 2006

(54) TELEDAGA MIRROR

(75) Inventors: William Schmidt, Newport, MI (US); Daniel M. Swain, Wyandotte, MI (US)

(73) Assignee: Mirror Lite, Rockwood, MI (US)

( * ) Notice: Subject to any disclaimer, the term of this patent is extended or adjusted under 35 U.S.C. 154(b) by 0 days.

(21) Appl. No.: 10/904,713

(22) Filed: Nov. 24, 2004

(51) Int. Cl.

| | |
|---|---|
| ***G02B 3/02*** | (2006.01) |
| ***G02B 5/10*** | (2006.01) |
| ***G02B 7/02*** | (2006.01) |
| ***G02B 7/182*** | (2006.01) |
| ***B60R 1/06*** | (2006.01) |

(52) U.S. Cl. ...................... 359/708; 359/811; 359/868; 359/871

(58) Field of Classification Search ................ 359/868, 359/869, 708, 811, 851, 866, 871
See application file for complete search history.

(56) References Cited

U.S. PATENT DOCUMENTS

| | | | | |
|---|---|---|---|---|
| 3,774,995 | A * | 11/1973 | Perret et al. | 359/869 |
| 4,436,372 | A * | 3/1984 | Schmidt et al. | 359/868 |
| 4,730,914 | A * | 3/1988 | Stout | 359/868 |
| 4,822,157 | A * | 4/1989 | Stout | 359/868 |
| 5,005,963 | A * | 4/1991 | Schmidt et al. | 359/868 |
| 5,084,785 | A * | 1/1992 | Albers et al. | 359/868 |
| 5,307,211 | A * | 4/1994 | Schmidt et al. | 359/868 |
| 5,567,487 | A * | 10/1996 | Head | 428/14 |
| 5,589,984 | A * | 12/1996 | Schmidt et al. | 359/603 |
| 6,030,084 | A * | 2/2000 | Schmidt | 359/868 |
| 6,227,674 | B1 * | 5/2001 | Englander | 359/853 |
| 6,282,771 | B1 * | 9/2001 | Englander | 29/450 |
| 6,328,450 | B1 * | 12/2001 | Englander | 359/853 |

* cited by examiner

*Primary Examiner*—Ricky D. Shafer
(74) *Attorney, Agent, or Firm*—Thomas E. Donohue; Artz & Artz, P.C.

(57) ABSTRACT

A vehicle mirror assembly 10 is provided. The vehicle mirror assembly 10 comprises a base 12 comprising a first base ellipsoidal portion 32 having a constant first minor axis 27' and a major longitudinal axis 38. The base 12 further comprises a second base ellipsoidal portion 34 having a second base minor axis 27" and sharing the major longitudinal axis 38. The first minor axis 27' and said second minor axis 27" are merged to form a common minor axis 27. The major longitudinal axis 38 intersects the common minor axis 27 in a position non-coincidental with a center of said common minor axis 27. The mirror assembly 10 further includes a dome lens 14 conforming to the base 12. The dome lens 14 comprises a first surface elliptical portion 48 having a longitudinal axis radius of curvature R1 taken along the major longitudinal axis 38 and a first minor radius of curvature R3 taken along the first minor axis 27'. The first surface elliptical portion 48 conforms to the first base ellipsoidal portion 32. The dome lens 14 further includes a second surface elliptical portion 50 having the longitudinal axis radius of curvature R1 taken along the major longitudinal axis 38 and a second minor radius of curvature R4 taken along the second minor axis 27". The second surface elliptical portion 50 conforms to the second base ellipsoidal portion 34.

20 Claims, 1 Drawing Sheet

TELEDAGA MIRROR

TECHNICAL FIELD

The present invention relates generally to an exterior automotive mirror assembly, and, more particularly to a front-end mounted exterior automotive cross-over mirror including a plurality of ellipsoids.

BACKGROUND OF THE INVENTION

Automotive mirror assemblies can play a vital role in vehicle operation. Placement of the vehicle operator within the vehicle structure often makes direct line-of-sight to surrounding vehicle areas impractical. Yet such visual inspections of surrounding areas can provide the vehicle operator with information necessary for proper vehicle operation. As vehicle size increases, so often does the difficulty of accurate visual inspections. Vehicles, such as school buses, often utilize increased vehicle sizes while requiring visual inspection of areas in front of and to the side of the vehicle. To this end, it is well known that vehicle mirrors may be front-end mounted to the vehicle to provide the widest possible field of view around the vehicle.

Early attempts at widening the operator's field of view focused on the use of convex mirrors. By increasing the size of the convex mirror, it was discovered that the field of view could be increased. Unfortunately, increasing the size of the convex mirror quickly becomes inefficient as the mirror itself begins to become an obstruction to forward viewing. To accommodate the need for increased field of view, without negatively impacting mirror size, it is known that a domed mirror lens may incorporate a varying radius of curvature along one of either the major or minor axis. The varying radius of curvature achieves a compacted wide field of view or viewing area within minimal space such that the driver can look forward of the vehicle with minimal blockage of vision. These mirrors with varying radius of curvature along one axis are commonly referred to as cross-over mirrors.

Although the use of cross-over mirror designs has proven highly successful in the increase of viewing area while minimizing mirror size, present designs still can incorporate drawbacks. One of the drawbacks of these common cross-over mirror designs results from the distortion of images reflected in the mirror. Image distortion can result from the depth of the dome and the varying radius of curvature of the lens. This distortion can result in a reflected image of an object that is either elongated or widened depending on the orientation of the axes of the mirror. In addition, the cross-over mirrors often suffer from the inability to "centralize" the field of view.

It would, therefore, be highly desirable to have a mirror assembly that provides allows for a centralized field of view. It would further be highly desirable to have a mirror assembly that could provide such a centralized field of view while minimizing distortion of images reflected in the mirror assembly.

SUMMARY OF THE INVENTION

A vehicle mirror assembly is provided. The vehicle mirror assembly comprises a base comprising a first base ellipsoidal portion having a constant first minor axis and a major longitudinal axis. The base further comprises a second base ellipsoidal portion having a second base minor axis and sharing the major longitudinal axis. The first minor axis and said second minor axis are merged to form a common minor axis. The major longitudinal axis intersects the common minor axis in a position non-coincidental with a center of said common minor axis. The mirror assembly further includes a dome lens conforming to the base. The dome lens comprises a first surface elliptical portion having a longitudinal axis radius of curvature taken along the major longitudinal axis and a first minor radius of curvature taken along the first minor axis. The first surface elliptical portion conforms to the first base ellipsoidal portion. The dome lens further includes a second surface elliptical portion having the longitudinal axis radius of curvature taken along the major longitudinal axis and a second minor radius of curvature taken along the second minor axis. The second surface elliptical portion conforms to the second base ellipsoidal portion.

Other features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
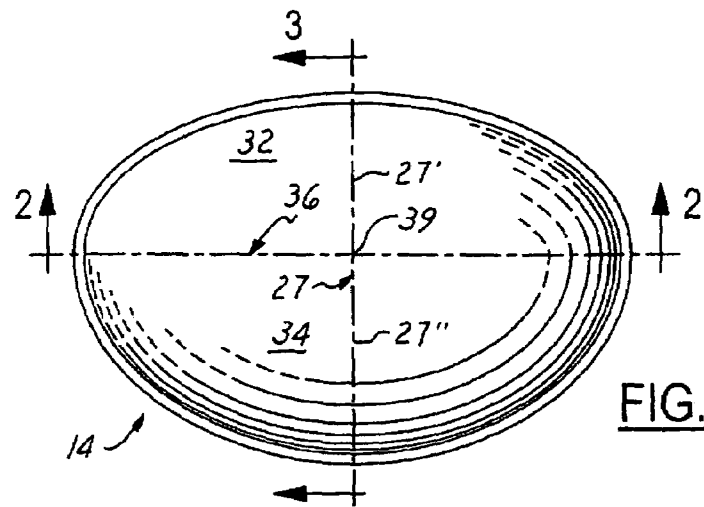
FIG. 1 is a top view illustration of a mirror in accordance with the present invention.

Referring now to FIG. 1, which is an illustration of a mirror assembly 10 in accordance with the present invention. The mirror assembly 10 comprises a mirror housing, also referred to as a footprint or base 12. The mirror assembly 10 further comprises a lens or dome 14 having an outer peripheral flange 30. The flange 30 preferably seats on an upper surface 13 of the housing 12 and is mounted thereon. Preferably, a gasket 15 (see FIGS. 2 and 3) or similar member is utilized to cover the flange 30 and the peripheral edge 16 of the housing 12. It should be understood that the flange 30 preferably comports to the configuration of the periphery of the upper surface of the housing 12.

Figure 4:
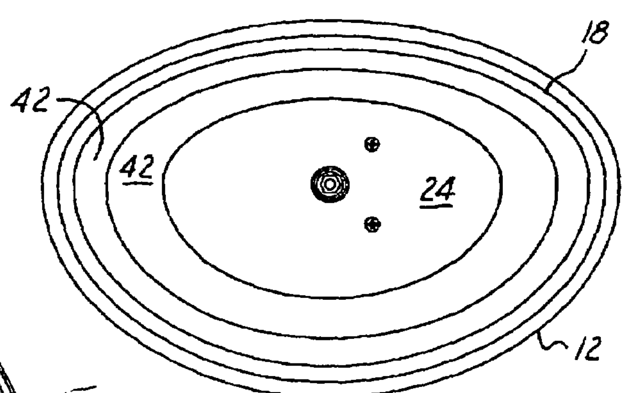
FIG. 4 is a rear view illustration of the mirror illustrated in FIG. 1.
Figure 5:
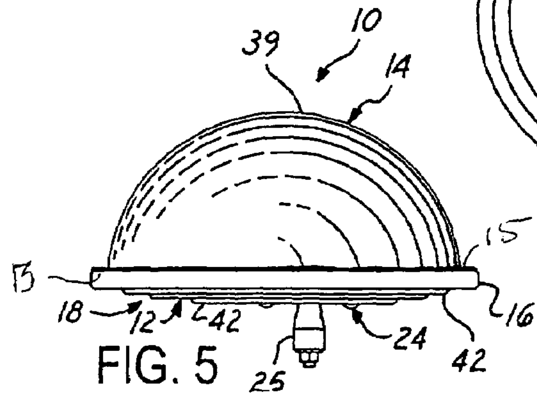
FIG. 5 is a side-view illustration of the mirror illustrated in FIG. 1.

As shown in FIGS. 4 and 5, the mirror housing 12 comprises a substantially flat and oval shaped member 18 having an upper surface (not shown) and a rear or backing surface 24. The housing is adapted to receive any conventional mounting member, such as, a "tunnel mount" of the type exemplified in U.S. Pat. Nos. 5,316,257, 4,500,063 and 5,106,049 or variants thereof. The disclosure of these patents is hereby incorporated by reference. These "tunnel" mount" in use, hone their respective based secured to the rear surface 24 of the housing 12 and are used to secure a shaft (not shown) thereto. Alternately, a ball stud mount 25, as illustrated in FIGS. 4 and 5, may be used herein. Although two examples of mounting structures have been disclosed, it should be understood that a wide variety of mounting mechanisms and structures are contemplated by the present invention.

As shown on FIG. 1 the base 12 hereof is defined by a portion 32 of a first ellipsoidal segment and a portion 34 of a second ellipsoidal segment, each of the ellipsoidal segments or portions having or showing a common longitudinal axis 36 (shown in phantom). Thus, in essence, the base 12 is defined by the integration of portions of two different ellipses which share a common longitudinal axis 36. Preferably, the longitudinal axis 36 will range in length from about 10 inches to about 15 inches. The base 12 has a common minor axis 27 defined at the merger or junction of the minor axes 27' and 27" of their respective ellipses. Ordinarily, the common longitudinal axis 36 will have a ratio of to the common minor axis 27 of about 1.1:1 to about 1.5:1. In addition, in at least one embodiment, the dimensional length of the upper minor axis 27' is smaller that the dimensional length of the lower minor axis 27". It should be understood that the terms upper and lower are utilized for descriptive purposes only. The housing 12, which, preferably, is formed of metal, such as aluminum, steel or the like is manufactured by any suitable mode such as by stamping or the like. The housing, alternatively, may be molded from a suitable rigid plastic, such as an ABS resin or the like.

Figure 2:
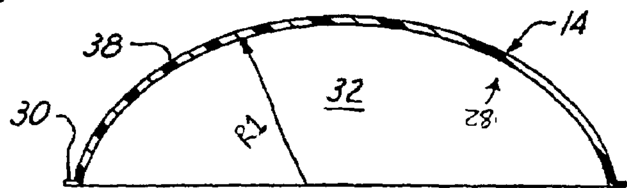
FIG. 2 is a cross-sectional illustration of the mirror illustrated in FIG. 1, the cross-section taken along the line 2—2 in the direction of the arrows.
Figure 3:
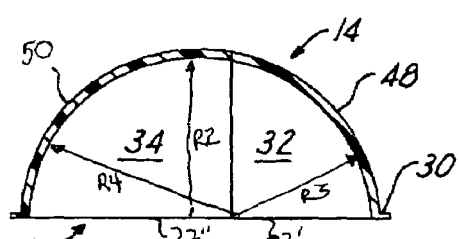
FIG. 3 is a cross-sectional illustration of the mirror illustrated in FIG. 1, the cross-section taken along the line 3—3 in the direction of the arrows.

The mirror lens 14 comprises a dome 28 having the peripheral ledge or flange 30 integral therewith. The flange 30 seats on the upper surface of the housing 12 to provide the mating engagement there between. The flange 30, generally comports to the configuration of a periphery of the upper surface of the housing 12. The dome or mirror lens 28 is fitted and conforms to the base 12. The dome or lens 28, therefore, includes a first surface elliptical portion 48 which conforms to the first ellipsoidal segment 32 of the base 12. The dome 28 further includes a second surface elliptical portion 50 which conforms to the second ellipsoidal segment 34 of the base. The first ellipsoidal segment 32 and the second ellipsoidal segment 34 merge along the common longitudinal axis 36. The cross-section 2—2 taken along the major longitudinal axis 38 of the dome 28 illustrated in FIG. 2 shows a longitudinal axis radius of curvature R1 preferably having a varying radius of curvature. The longitudinal axis radius of curvature R1 preferably has its radius diminished toward the peripheral edge 16.

It should be noted that the major longitudinal axis 38 of the dome 28 in one embodiment is not identical with the major central axis 39 running through the apex that defines the center-point along the surface minor axis 40. In this embodiment, the dome 28 has a constant minor radius of curvature R2 along the surface minor axis 40. In such as case, the major central axis 39, as defined by the apex, does not coincide with the major longitudinal axis 38. It should be understood, that the major central axis 39 will also have a varying radius of curvature which, like the major longitudinal axis 38, has its radius diminished toward the outer edge. Although not wishing to be bound by any theory, it appears that during the formation of the mirror lens, because of the configuration of the base 12 it essentially causes the constant minor radius of curvature R2 along the minor axis of the dome to be formed. In alternate embodiments, however, it is contemplated that the minor radius of curvature R2 may actually be comprised of a first minor radius of curvature R3 corresponding to the first surface elliptical portion 48 and a second minor radius of curvature R4 corresponding to the second surface elliptical portion 50. It should be understood that the first surface elliptical portion 48 and the second surface elliptical portion 50 may be constant radius curves, varying radius curves, or any combination thereof. The instant lens, at the apex or at the intersection of each of the surface axes has a diameter to height ratio ranging from about 2.0 to 2.5 and, preferably from about 2.1 to about 2.5.

The present invention, in essence, shifts the major axis of the mirror from the major central axis 39 to the major longitudinal axis 38. As a consequence thereof there is provided a first ellipsoidal segment 32, first surface elliptical portion 48, which is "flatter" than the second ellipsoidal segment 34, second surface elliptical portion 50. The term "flatter" is defined as the ellipse having a smaller minor axis length to major axis length ratio for the ellipse from which the ellipsoidal segment 32 was based. This results in a larger image at the peripheral edge and a smaller image and a greater field of view in the center of the mirror lens. In addition, the utilization of a constant minor radius of curvature R2 along the minor surface axis 40 further improves the view in the center of the mirror lens by reducing distortion.

As shown in FIGS. 4 and 5, the rear surface 24 of the base 12 may be provided with a plurality of concentric ridges 42 each of which conforms to the conformation of the base, per se. Each ridge is raised with respect to its adjacent one to create a stepped configuration with the smallest diameter thereof being that closest to the center of the base. The concentric steps provide an aesthetic value to the base plate. In addition they may be utilized to strengthen the base plate 12 as well as increase the distance of the dome lens 14 from the mirror mounting. As noted, the present lens is manufactured by any suitable mode including thermoforming, injection molding or the like. The materials of construction are selected such that upon formation there is no collapse at the central portion of the lens to thus eliminate the potential of negative curvatures and distortion thereat.

The present mirror lens 14 may be manufactured from any suitable "silverized" plastic by any suitable mode including thermoforming, injection molding, forming or the like. The materials of construction are preferably selected such that upon formation there is no collapse at the central portion of the lens to thus eliminate the potential of negative curvatures and distortion thereat. The thermoforming process may comprise either a forced air process or a vacuum forming process, both of which are well known to the skilled artisan. Where the lens is manufactured by a vacuum forming process, a vacuum chamber equipped with evacuation means is typically provided with an opening conforming to the shape of the mirror base 12 and over which is placed a sheet of softened plastic. Thereafter, a vacuum is drawn within the chamber causing the softened plastic to "drop" within the chamber, cool, and then harden. Upon cooling and hardening, the plastic sheet assumes a shape which conforms to that of the base 12. Forced air thermoforming is similar to vacuum forming, however, heat pressurized air is utilized to cause the softened, warm plastic sheet to use over an opening. Injection molding may additionally be utilized in order to mold the lens 14 to desired specifications. It should be understood, however, that although a specific manufacturing methodologies have been described, a variety of manufacturing methodologies may be utilized to implement the present invention.

It should be further noted with respect hereto that in manufacturing the present mirror the thermoplastic resin used to form the lens 14 may have a colorant or dye incorporated therewith such that the resulting lens comprises a colored reflective surface. Although the color or hue is chosen at the option of the user, preferred colors include a legal blue hue, amber and the like. Optionally, a glare reducing color can be chosen. Because the color is imparted to the resin which is used for form the lens 14, it is seen through the silverized or reflective layer which is deposited onto the surface of the lens or dome 14. Although a particular embodiment has thus been described, it should be understood that a wide variety of configurations are contemplated.

While particular embodiments of the invention have been shown and described, numerous variations and alternative embodiments will occur to those skilled in the arm. Accordingly, it is intended that the invention be limited only in terms of the appended claims.

What is claimed is:

1. A vehicle mirror assembly comprising:

a base comprising:

a first base ellipsoidal portion having a constant first minor axis and a common longitudinal axis; and a second base ellipsoidal portion having a second base minor axis and sharing said common longitudinal axis, said first minor axis and said second minor axis merging to form a common minor axis, said common longitudinal axis intersecting said common minor axis in a position non-coincidental with a center of said common minor axis;

a dome lens conforming to said base, said dome lens comprising:

a first surface elliptical portion having a longitudinal axis radius of curvature taken along a major longitudinal axis and a first minor radius of curvature taken along said first minor axis, said first surface elliptical portion conforming to said first base ellipsoidal portion; and a second surface elliptical portion having said longitudinal axis radius of curvature taken along said major longitudinal axis and a second minor radius of curvature taken along said second minor axis, said second surface elliptical portion conforming to said second base ellipsoidal portion.

2. A vehicle mirror assembly as described in claim 1, wherein said first minor radius of curvature and said second minor radius of curvature are identical and comprise a constant minor radius of curvature.

3. A vehicle mirror assembly as described in claim 1, wherein said longitudinal axis radius of curvature is a varying radius of curvature.

4. A vehicle mirror assembly as described in claim 3, further comprising:

a peripheral edge running contiguously around said first base ellipsoidal portion and said second base ellipsoidal portion, said longitudinal axis radius of curvature diminishing toward said peripheral edge.

5. A vehicle mirror assembly as described in claim 1, wherein the ratio of said common longitudinal axis to said common minor axis is between 1:1 and 1.5:1.

6. A vehicle mirror assembly as described in claim 1, further comprising:

a peripheral flange running contiguously around said first base ellipsoidal portion and said second base ellipsoidal portion.

7. A vehicle mirror assembly as described in claim 1, wherein said dome lens has a height to said common minor axis ratio between 1:2 and 1:2.5.

8. A vehicle mirror assembly as described in claim 1, further comprising:

a plurality of concentric ridges formed into a rear surface of said base.

9. A vehicle mirror assembly as described in claim 1, further comprising:

a ball stud mount in communication with a rear surface of said base.

10. A vehicle mirror assembly as described in claim 1, wherein said dome lens comprises a thermoplastic resin impregnated with colorant.

11. A mirror assembly comprising:

a base comprising:

a first base ellipsoidal portion having a constant first minor axis and a common longitudinal axis; and a second base ellipsoidal portion having a second base minor axis and sharing said common longitudinal axis, said first base ellipsoidal portion flatter than said second base ellipsoidal portion, said first minor axis and said second minor axis merging to form a common minor axis;

a dome lens conforming to said base, said dome lens comprising:

a first surface elliptical portion having a longitudinal axis radius of curvature taken along a major longitudinal axis and a first minor radius of curvature taken along said first minor axis, said first surface elliptical portion conforming to said first base ellipsoidal portion; and a second surface elliptical portion having said longitudinal axis radius of curvature taken along said major longitudinal axis and a second minor radius of curvature taken along said second minor axis, said second surface elliptical portion conforming to said second base ellipsoidal portion.

12. A mirror assembly as described in claim 11, wherein said common longitudinal axis intersecting said common minor axis in a position non-coincidental with a center of said common minor axis.

13. A mirror assembly as described in claim 11, wherein said first minor radius of curvature and said second minor radius of curvature are identical and comprise a constant minor radius of curvature.

14. A mirror assembly as described in claim 11, wherein said longitudinal axis radius of curvature is a varying radius of curvature.

15. A mirror assembly as described in claim 11, further comprising:

a peripheral edge running contiguously around said first base ellipsoidal portion and said second base ellipsoidal portion, said longitudinal axis radius of curvature diminishing toward said peripheral edge.

16. A mirror assembly as described in claim 11, further comprising:

a peripheral flange running contiguously around said first base ellipsoidal portion and said second base ellipsoidal portion.

17. A mirror assembly as described in claim 11, wherein the ratio of said common longitudinal axis to said common minor axis is between 1:1 and 1.5:1.

18. A mirror assembly as described in claim 11, wherein said dome lens has a height to said common minor axis ratio between 1:2 and 1:2.5.

19. A mirror assembly as described in claim 11, further comprising:

a plurality of concentric ridges formed into a rear surface of said base.

20. A mirror assembly as described in claim 11, wherein said dome lens comprises a thermoplastic resin impregnated with colorant.

* * * * *